Nov. 10, 1936.  A. L. WARNER  2,060,150
DEVICE FOR OPENING MOWER PITMAN STRAPS
Filed Oct. 10, 1934
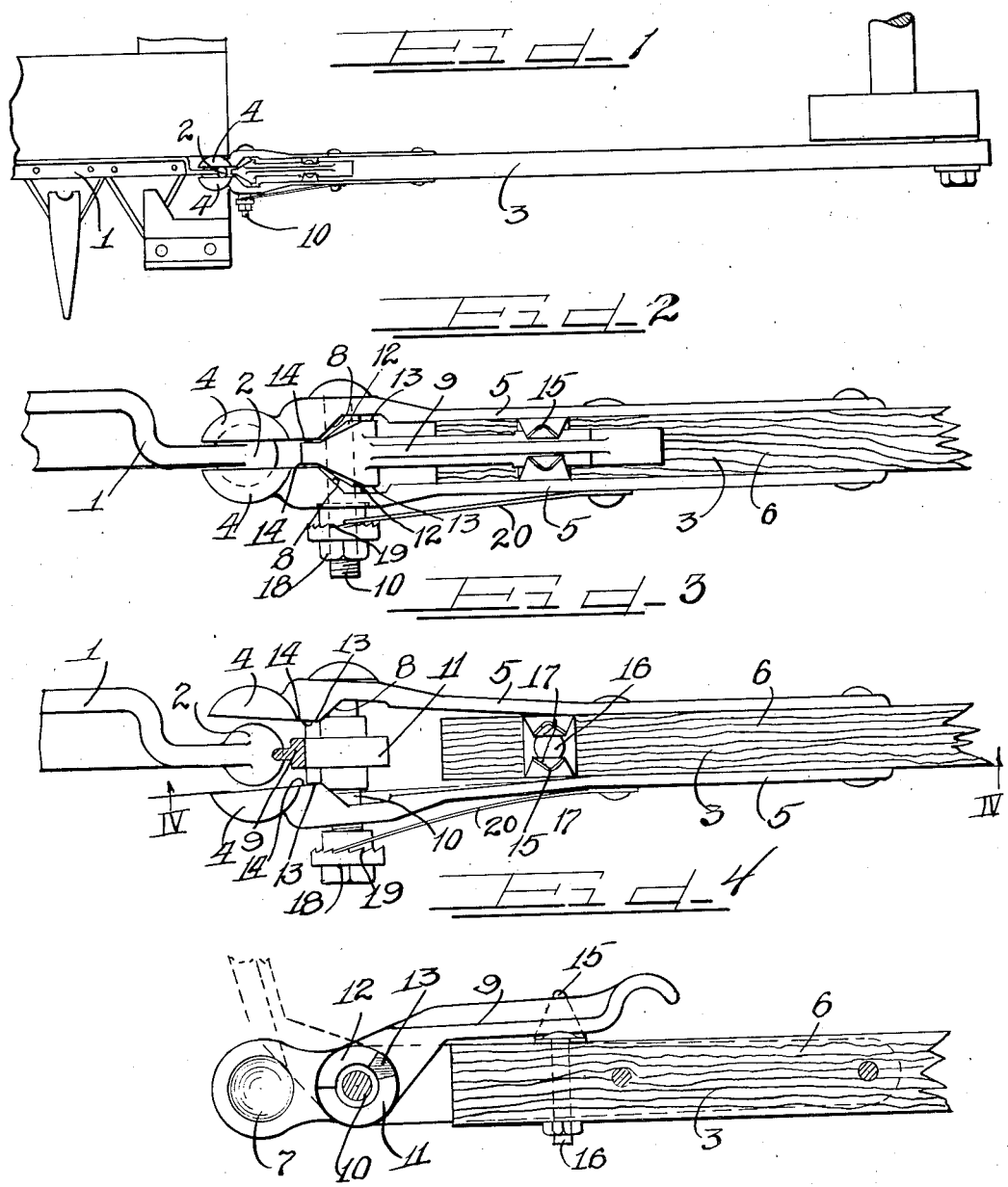

Patented Nov. 10, 1936

2,060,150

UNITED STATES PATENT OFFICE 2,060,150

DEVICE FOR OPENING MOWER PITMAN STRAPS

Arthur L. Warner, Elgin, Ill., assignor to Illinois Iron & Bolt Company, Carpentersville, Ill., a corporation of Illinois Application October 10, 1934, Serial No. 747,739

2 Claims. (Cl. 287—89)

This invention relates to a device for opening mower pitman straps having a pair of complementary bearings for engaging the ball on the knife or sickle head and concerns itself with means for readily spreading the complementary bearings for engaging or disengaging the same from the knife head.

The invention comprises the novel structure and combination of parts hereinafter described and more particularly pointed out and defined in the appended claims.

In the accompanying drawing, which illustrates a preferred embodiment of this invention, and in which similar reference numerals refer to similar features in the different views:

Figure 1 is a top plan view of a mower pitman attached to a knife head shown in fragmentary view and involving this invention.

Figure 2 is an enlarged fragmentary top plan view of the same.

Figure 3 is a view similar to Figure 2 showing the bearings on the pitman spread apart with respect to the bearing on the knife head.

Figure 4 is a fragmentary sectional view taken on the line IV—IV of Figure 3.

In the drawing there is shown the inner end of a mower knife head 1 having a spherical bearing 2 thereon to which a pitman 3 involving this invention is removably secured by means of complemental spreadable bearings 4 integral with arms 5 attached to the pitman rod 6. Each bearing 4 has an interior parti-spherical surface 7 for engaging the spherical bearing 2.

The interior sides of the arms 5 are formed with sloping surfaces 8 just rearwardly of the bearings 4. These surfaces 8 slope toward each other in the direction of the bearings 4. A bearing spreading device 9 in the form of a lever is pivoted at its forward end between bearing arms 5 upon a fulcrum bolt 10 extending through the arms a short distance rearwardly of the bearings 4. The hub 11 of the lever 9, which is pivoted upon the bolt 10, is provided with rearwardly diverging sides 12, best shown in Figure 2, that form a wedge that is adapted for engaging the sloping surfaces 8 when the said lever 9 is elevated to substantially vertical position with respect to the pitman 3 for spreading the bearings 4.

Rearwardly of the sloping surfaces 12 are flat portions 13 on the hub of the lever 9 that are adapted for engaging between straight surfaces 14 on the bearing arms 5. The flat bearing surfaces 14 are located between the bearings 4 and the sloping surfaces 8, with the result that when the lever 9 is swung upwardly, as shown in Figure 3, the flat surfaces 13 will engage the straight surfaces 14 and lock the bearing arms 5 in spread apart position.

A latch 15 is secured upon the pitman for retaining the lever 9 in its normally inoperative position. This latch comprises a resilient U-shaped member having a restricted entrance slot 16 caused by inwardly bowed portions 17 on the sides of the latch member.

The nut 18 on the bolt 10 is provided with a ratchet face 19 that is engaged by a spring pawl 20 secured to the pitman for locking the nut against reverse movement.

It will be apparent from the foregoing that this invention saves considerable time and labor over the structures heretofore used and offers the operator a much higher degree of safety, for in the past it was necessary to insert cold chisels, punches or some devices between the complemental bearings on the pitman and the wood thereof, thus holding the complemental bearings sufficiently apart to enable the pitman to be detached from the knife or sickle head whenever it was desired to sharpen or replace the knives, or sections as they are sometimes termed, on same. As the knives require frequent sharpening and replacement, the bearings had to be thus separated and held apart at frequent intervals, occasioning considerable work and loss of time. Many times the devices used for holding apart the straps or complemental bearings slip from place and cause injury to the operator. This invention obviates time, labor and trouble that was heretofore involved in removing the cutter bar or sickle in prior structures. According to this invention, it is only necessary to swing a lever to separate and hold separated the straps or complemental bearings to the required distance.

I claim as my invention:

1. The combination with a member having a substantially spherical bearing, of a pitman having resilient arms with complemental bearings engaging respectively opposite portions of said spherical bearing, said arms having sloping surfaces upon their confronting faces, said sloping surfaces merging into plane portions, a bolt extending through said arms adjacent said sloping surfaces, a lever having a hub pivoted upon said bolt, said hub having sloping surfaces for engaging said sloping surfaces on said arms for spreading the same and having flat portions rearwardly of said sloping surfaces for engaging between the plane portions on said arms for maintaining the same in spread apart position.

2. The combination with a member having a substantially spherical bearing, of a pitman having parallel resilient arms with complemental bearings engaging respectively opposite portions of said spherical bearing, said arms having sloping surfaces upon their confronting faces, said sloping surfaces merging into flat surfaces substantially parallel with said arms when the same are in their normal positions, a bolt extending through said arms and a lever pivoted upon said bolt between said arms, said lever having an enlarged hub, said hub having sloping surfaces for engaging the sloping surfaces on said arms for spreading the same further apart and having flat surfaces rearwardly of said sloping surfaces and substantially parallel with said lever for engaging between the flat portions of said arms for maintaining the same in spread apart positions.

ARTHUR L. WARNER.